Dec. 2, 1941.  S. A. OCHS  2,264,546
SURFACE COVERING AND ASSEMBLY THEREOF
Filed Oct. 9, 1939  3 Sheets-Sheet 1
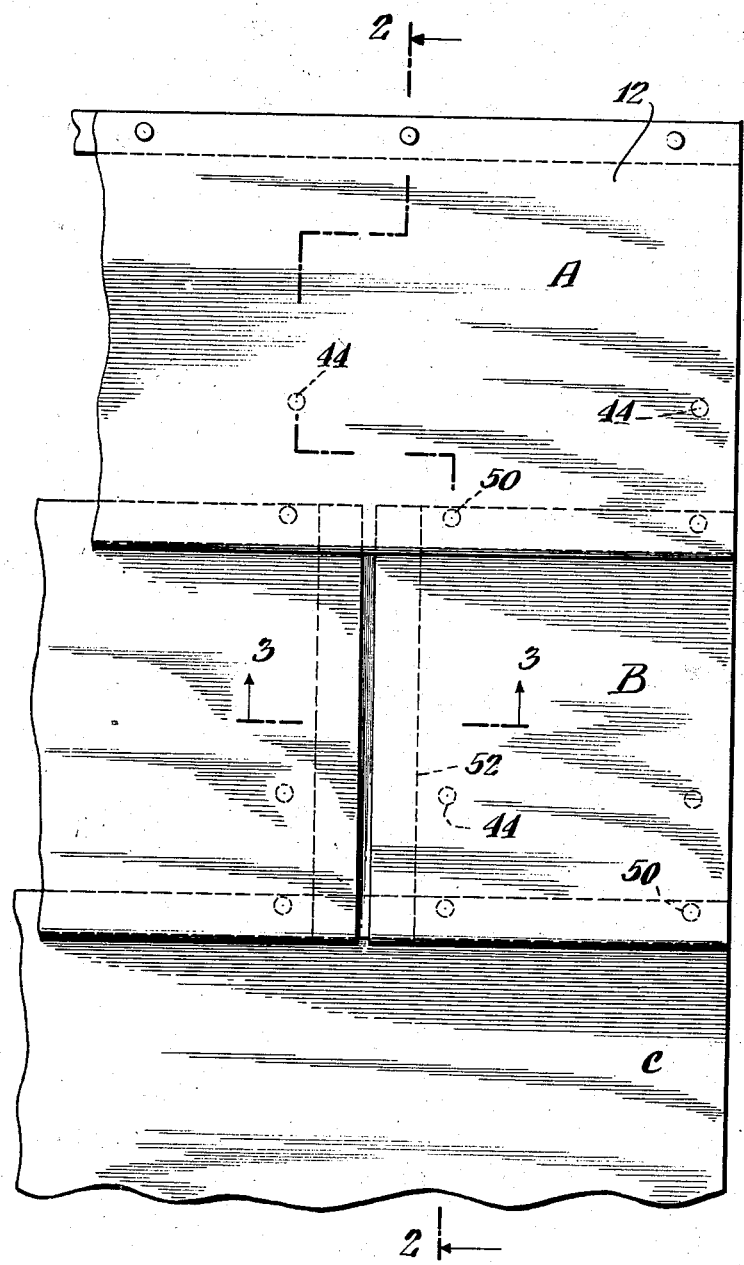
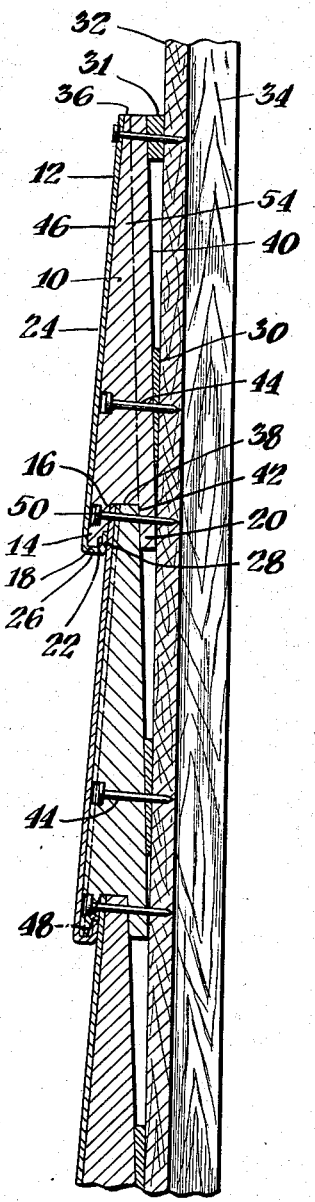
INVENTOR
Sidney A. Ochs
BY
Fred. W. Dodson.
ATTORNEY

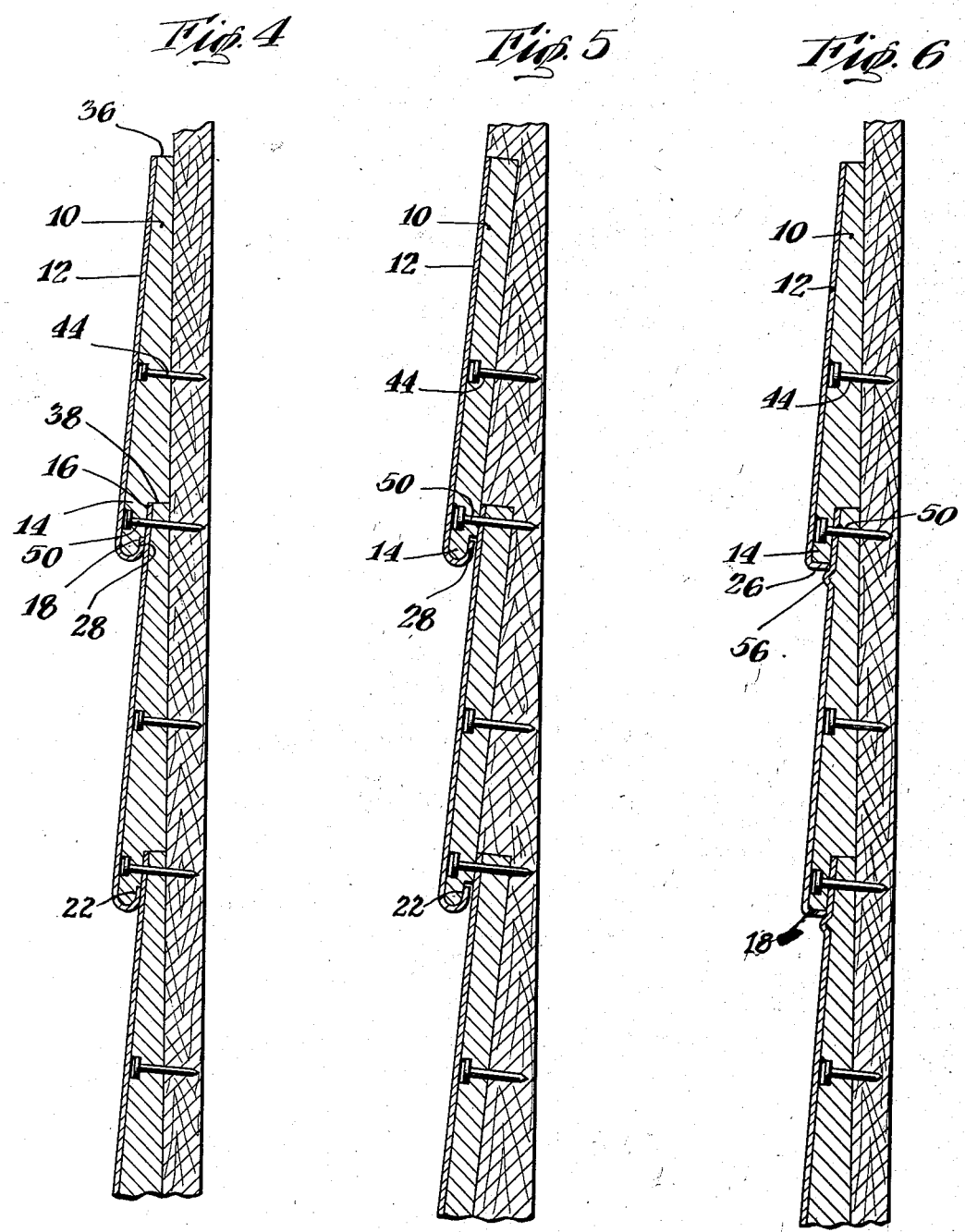

Dec. 2, 1941.  S. A. OCHS  2,264,546
SURFACE COVERING AND ASSEMBLY THEREOF
Filed Oct. 9, 1939  3 Sheets-Sheet 3
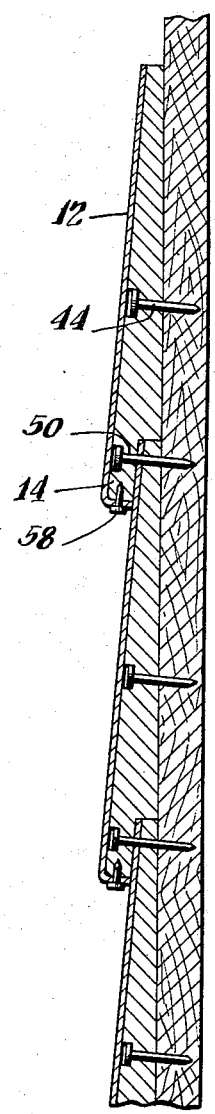
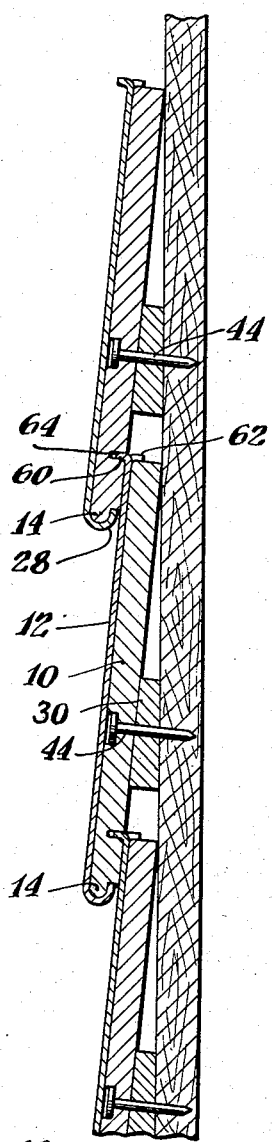
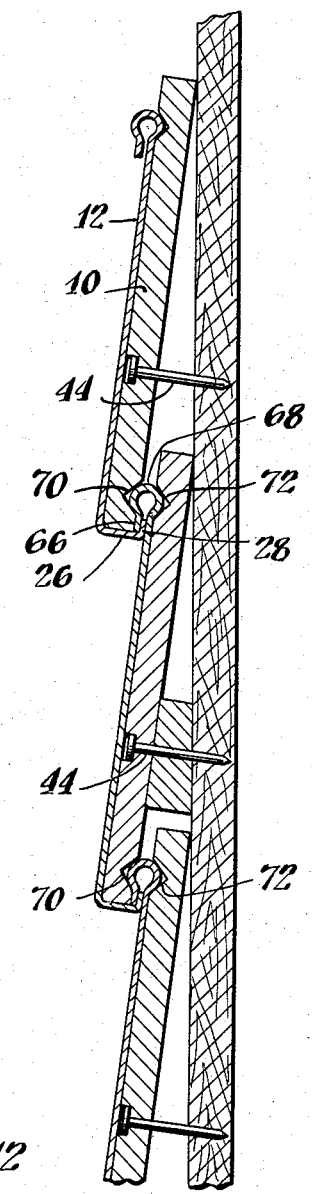
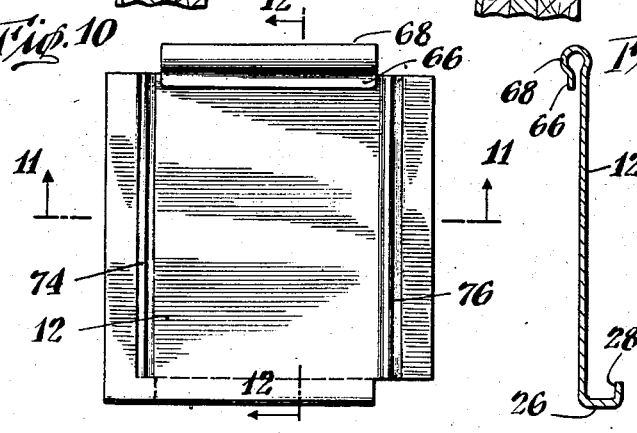
INVENTOR
Sidney A. Ochs
BY
Fred. W. Dodson.
ATTORNEY Patented Dec. 2, 1941

2,264,546

UNITED STATES PATENT OFFICE 2,264,546

SURFACE COVERING AND ASSEMBLY THEREOF

Sidney A. Ochs, New York, N. Y., assignor, by mesne assignments, to Carbide and Carbon Chemicals Corporation, New York, N. Y., a corporation of New York Application October 9, 1939, Serial No. 298,539

10 Claims. (Cl. 20—5)

This invention relates to weather and insulation surface coverings, particularly to improvements in such surface coverings for side wall and the like applications.

An object of the invention is to provide a surface covering comprising courses of composite elements, including base members of relatively stiff insulation material and weather resistant cover pieces therefor, both being capable of easy and rapid assembly with a minimum of fasteners for securing the same, and capable of producing, when laid, an efficient weather surface covering of substantial insulation value.

Another object of the invention is the provision of a siding covering comprising courses of insulation members and loose, preformed, cover pieces to be assembled to said insulation members, wherein the same fastening means may be utilized to secure a pair of said insulation members of adjacent courses and a cover piece covering one of said members, and may itself be protected from the weather by the cover piece for the second of said pair of insulation members.

A further object of the invention is the provision of a surface covering construction comprising courses of overlapping insulation members in which the lapping faces of the members in the overlap between courses are spaced apart to provide a predetermined space to subsequently receive the cover piece of the lower of the lapping members, such space having a depth normal to the lapping faces substantially the thickness of the cover piece in the portion to be inserted in said space.

A still further object is to provide an insulation member having greater thickness at its lower edge portion than at its upper edge portion, and having a recess at the edge of greater thickness formed by a rabbet or groove, which is substantially coextensive therewith, and which provides an outer face lip adapted to overlap the upper end of a similar member in assembly, the said recess having a depth in the direction of thickness of the members substantially equal to the thickness of the opposite end of a similar member, plus that of a cover piece for said member to be inserted in the lap between the members in assembly.

Another object is to provide a relatively stiff base of insulation material and a loose, preformed cover piece therefor, the cover piece having a hook-like marginal lip and the base having a lip including a step to receive the lip of the cover piece when the two are assembled.

A further object is to provide a cover piece for insulation members having at least its upper marginal portion treated to stiffen the same, to facilitate assembly of said marginal portion in the space provided between a pair of insulation members when laid.

Another object of the invention is to provide an insulation covering utilizing metallic cover pieces requiring no nailing.

These and other and related objects of my invention, with particular regard to the novel insulation and cover members and novel formation of surface coverings, will more readily appear or be suggested to those skilled in the art by the following detailed description and claims, and from the accompanying drawings forming a part thereof, wherein I have presented certain instances of adaptation of my invention as will disclose the broad, underlying features thereof without limiting myself to the specific details shown and described.

In the drawings:

Fig. 1 is a face view of a surface covering constructed in accordance with my invention.

Fig. 2 is a sectional elevation taken at 2—2 of Fig. 1.

Fig. 3 is a sectional elevation taken at 3—3 of Fig. 1.

Fig. 4 is a cross-sectional view illustrating the invention as applied to a modified form of construction.

Figs. 5, 6 and 7 are cross-sectional views showfurther modifications applying the invention.

Figs. 8 and 9 are cross-sectional view of a surface covering using a novel form of cover piece.

Figs. 10, 11 and 12 are views of one manner of making the cover piece of Fig. 8.

Referring to Figs. 1 to 11 inclusive, wherein similar numerals indicate similar parts of the disclosed coverings, 10 is a base member preferably of stiff or rigid characteristics, to be covered, and preferably comprising a body of compressed or cemented vegetable and/or mineral fibrous material, for instance, bagasse, wood, substantially pure cellulose fiber, paper stock, sugar cane fiber, asbestos, mineral wool, animal hair, and others, usually used either alone or in combination, or adapted to be used in the making of products generally known to those skilled in the art, as wall board or insulating board. One form of commercial product of this character which I may use in the present invention is marketed under the name "Celotex."

Also, in certain constructions where the insulation factor is not of utmost importance, the base may be a cement-asbestos composition or may be a bitumen mastic having scrap materials as added fillers.

The fibrous base may be of the same structure throughout or may comprise a plurality of separate sheet-like plies bonded face to face by suitable means, for instance, cement or staples, to form an integral base structure. The base may also be rendered waterproof and/or fire-resistant by treatment with suitable agents, such as silicates and bitumens, but is preferably treated with a synthetic resin composition of the phenol aldehyde or vinyl types, adapted to produce substantially water-insoluble and impervious films upon deposit from solutions of the same in suitable volatile solvents. The treatment may be applied to one or more faces and edges of the base structure, or may even extend throughout the same, and may be effected by coating, saturating, or impregnating. If the base is made of several plies, one or more, preferably that to be positioned next to the cover piece, may be treated, thus assuring maximum retention of unfilled voids. The treatment may also be confined to certain sections of the base, for instance, to the portion to back up weather joints of further covering material.

The base covering member 12 preferably comprises a water-resistant foundation layer and a surface layer comprising a rigidifying composition. The foundation layer may be a layer of composition roofing generally comprising a flexible felted fibrous base of any of the fibrous materials heretofore mentioned, impregnated or saturated with a low melting point asphalt and coated with a further bituminous and/or resinous layer, also of the types heretofore mentioned. Such material is also usually surfaced with a layer of individual granules, for instance, of slate, brick, tile, or cement, to ornament the same; and these are usually partially embedded in and bonded to the adhesive layer. Composition material of this type may also include a surface rigidifying layer, preferably a hydraulic cement, for instance, a high aluminate cement composition, but may be a layer of synthetic resin composition which, when hardened, produces a stiff rigidifying film or layer. It will be understood that coatings of these materials may extend over the whole or part of the cover piece, dependent upon the extent to which rigidification is required. In some instances, it may be desired to utilize a cover member of metal, for instance, copper, zinc, or galvanized iron. If in flat form, it should be sufficiently heavy to provide adequate stiffness. Relatively light flexible material may be used, but the surface thereof should preferably be formed as by ribs, etc., to give the same substantial rigidity.

The base 10 in Fig. 2 is preferably a tapered section with the thickened portion thereof at the butt edge. A recess of groove-like character is provided substantially coextensive with the butt edge forming an outer or front lip or projection 14, having inner face 16 and edge face 18 and forming a rear lip or projection 20. The lip 14 is also provided with a step 22 formed by cutting a shallow recess or rabbet in the inner face 16 of said lip. The recess in the base is made wider than the thickness of the base at the upper end. The purpose of this will hereinafter be made more evident. The base may extend the full length of the course or may constitute a plurality of substantially abutted or lapped sections of a length suitable for handling.

The cover piece 12 is a preformed member independent of the base, and in Fig. 2 comprises a body portion 24, substantially the depth of the base 10 and a retroverted portion of hook-like character formed to fit the lip 14 and comprising a section 26 bent normal to the body portion and an upwardly extending lip 28 of a depth to seat in the step 22. Obviously, the cover member may be of the materials heretofore described, which, if of non-metallic materials, will preferably be rigidified at least at the upper marginal part of the body portion and around the bend of the retroverted portion to facilitate handling and assembly.

In assembling the units of Figs. 1 and 2, the base members 10 may be secured to the supporting surface in courses starting from the top or bottom, suitable filler pieces 30 and 31 being provided, if desired, to back-up the fastener, or the bases being provided with a projecting face to seat against the support. The support may, for instance, be the boarding 32 held by studding 34, although any suitable foundation for supporting the base units may be employed. When one course has been laid, the next course of base members will be positioned such that the upper ends of the bases of one course engage the recesses of the bases of the adjacent higher or lower course of bases as the case may be. In this step the upper edge 36 of the bases will abut the inner face 38 of the base recess, and the rear face 40 of the base will seat against the face 42 of the lip 20. The bases may then be secured to the support by a single row of fasteners such as nails 44. Thus the bases of adjacent courses may be easily and rapidly registered in position and nailed. It is preferred that the heads of the fasteners 44 be well seated in the base member, preferably such that they will not contact the cover piece 12 when laid in order to avoid electrolysis where the cover piece may be of dissimilar metal.

The cover pieces are assembled starting with the lowest course of bases and working upwardly, the upper ends of the body portions of the cover pieces being abutted against the outer faces 46 of the bases and slid upwardly into the recesses of the overlying base members until the lip 28 of the retroverted portion of the cover piece engages the step 22 of the lip 14 of the base being covered. Thus the base recess should be sufficiently larger than the upper end of the base to allow for the thickness of the cover piece at its upper end. It is preferred that a slight forcing action be necessary in assembling the cover piece such that a frictional contact be obtained, but it will be understood that a slightly oversized space may be utilized without difficulty. It is also preferred that the step 22 be of sufficient size such that the lip 28 of the cover piece may be assembled over the base lip 14 without difficulty and with clearance for the adjacent face of the underlying cover piece. Where it is desired to avoid the step 18 of the base members, the base lip may be tapered as shown by the dotted line 48 in Fig. 2 such that a slight wedge effect is obtained by the cover piece. The former construction, however, produces a better assembly.

Upon positioning the cover pieces in the manner described, fastening means such as nails 50 may then be secured into the lip 14 of the overlying base member and this be driven through said lip to connect with the underlying cover piece, the upper end of the base member covered by the cover piece, and the lip 16. It preferably passes through these parts into the support. It is, of course, desirable that the nails pass through the lip 14 at a position clearing the upper edges of the lips 28 of the cover pieces. Preferably they will be placed just adjacent this lip so that they pass through the upper end of the underlying base a maximum distance from its edge 36. The lips 14 should therefore be of sufficient length. Thus, by a single row of nails the cover pieces are anchored in position and without having such fasteners driven against the cover piece material where they might puncture the same, the lip 14 of the base material providing a broad surface for clamping the margin of the cover piece. Moreover, the base is thus further secured at an important point. Upon applying the next overlying course of cover pieces the heads of the nails 50 will be covered and protected thereby from the weather and in applying these members the heads of the nails do not interfere with assembly. It is to be noted that if the bases are laid working from the bottom of the surface, it is possible, if desired, to position the cover pieces and secure them as this work proceeds. Obviously, this makes application of the surface covering both simple and rapid. It should also be evident that the cover pieces are free to adjust themselves for changes in expansion and contraction, and without buckling.

Where the cover pieces are used in short lengths, it is preferred that a backing strip 52 (see Figs. 1 and 3) be provided, particularly where the base members have not been treated to be water impervious. In this manner, rain water is prevented from penetrating into the base material. The joint strips 52 may be assembled into suitable notches provided somewhere between the ends of the base members. It will, however, be understood that such pieces may be provided at the ends of the base members; also, that the base members, instead of abutting, may form a lap joint.

It is to be further noted that the base members in this structure may, as heretofore stated, be made a laminated structure, for instance, as indicated by the dot and dash line 54 in Fig. 2; also that in assembling the component parts of the surface covering of Figs. 1 and 2, registration of all parts is assured, and that no chalk lines or guesswork are necessary in accomplishing assembly.

In Figs. 4 through 8 inclusive, I have illustrated various modifications of my invention, including further features of joint construction between adjacent courses of composite units and involving a modification of the base and cover piece construction of Fig. 2. The differences only will be pointed out in the following description, but it will be understood that all other features of construction of these parts as described with respect to the units of Figs. 1 or 2, may, one or more, be included therein, particularly as relates to the materials and treatment thereof and the means of obtaining a waterproof covering, where the base and cover members are utilized in short lengths. In Fig. 4, the invention is illustrated as applied to a flat boarding surface in which no air spaces are provided behind the base insulation members. The base 10 is preferably of tapered section and is of greater thickness at the lower or butt edge than at the upper marginal portion of such base. The lower edge portion of the base is provided with a recess adjacent its rear face, forming a front lip 14. As in Fig. 2, the lip is also provided with a step 22 formed by rabbeting the lip 14 on its inner face portion. The lower end of the lip is rounded to facilitate assembly of the cover piece 12 and to avoid the making of sharp bends in preforming such cover members. The base members 10 may be laid in courses starting from the top or bottom, as may be desired, the upper inner face 38 of the base recess and the upper edge 36 of the adjacent base member being abutted to register the courses. When this occurs, the lip 14 of one member overlaps the adjacent lower base member to form a weather covering of the insulation members themselves. These base members, as previously indicated in describing Fig. 2 may also be secured by a single line of securing means 44. Subsequently, the cover pieces are moved into position with the upper ends thereof inserted between the inner face 16 of the lip 14 and the outer face 46 of the base member 10, it being noted that the recess at the lower edge of the base member is made of such depth as to permit assembly of this portion of the cover piece all as described with respect to Fig. 2. As also previously indicated with respect to Fig. 2, upon assembly of a cover member a further securing means such as a nail 50 is driven through the lip 14, passing through the upper end of the cover member and through the upper marginal portion of the underlying base; such means being covered by the next overlying cover member.

In Fig. 5, base members 10 and cover pieces 12 of somewhat similar character to that in Fig. 3 are illustrated. The base members differ from those in Fig. 3 in that they may be of uniform section throughout and are illustrated as applied to a siding having bevel faces offset from one another in step fashion. The thickness of the base members in this construction is substantially equal to the height of the steps or offset, less the thickness of the cover member, so that a space may be provided in the lap between adjacent courses of base members to facilitate assembly of the cover pieces, in the manner described with respect to Fig. 2. It should be noted that recessing or chamfering of the base members is only required for the cover piece lip 28, the lap between adjacent bases being accomplished by making them of greater depth than the face of the clapboards so that each base member overlaps the adjacent base and cover member of the underlying course.

The base members 10 in Fig. 6 are of similar construction to that of Fig. 4 but differ in that the lip 14 omits the notching provided for a retroverted cover member. In the instant modification, the cover member has its marginal portion 26 bent at a right angle and is not provided with any upwardly directed hook, and the lip 14 has its lower edge face 18 similarly angled to permit a proper fit with the cover piece. In order to prevent the marginal portions of the cover pieces from being pried or shifting from their positions against the base members, each is provided with a crimp or rib 56, adjacent its upper edge just below where the edge 18 of the next overlying base will be located. The shoulder thus formed acts as an abutment for the lip or flange of the next overlying cover piece, and also facilitates its assembly. Of course, the bases and cover pieces may be assembled as described with respect to Fig. 3, with a minimum of nailing, with definite registration of all parts and a weather-tight surfacing of both the base members and the cover members. The cover piece 12 in Fig. 6 is one particularly adapted for a sheet metal construction.

The construction in Fig. 7 is similar to that in Fig. 6, with the difference that the cover pieces 12 omit the rib feature 56, and have the lips thereof secured against the lower face of the lip 14 of the bases as by staples 58 or other suitable means.

The bases and cover pieces in Fig. 8 are in their basic constructions similar to those of Fig. 5. However, the assembly in Fig. 7 is somewhat different and is particularly adapted to the use of metal cover pieces and enables the applicator to dispense with the fasteners 50 described with respect to Fig. 5. As in Fig. 5, the base members 10 are provided with lips 14, which are engaged by the retroverted portions 28 of the cover pieces 12, thus holding the lower end of these cover pieces in position. However, the upper ends of the cover pieces instead of being flat, are provided along their full width, with outwardly struck flanges 60 of short height, which are slit at two or more points to provide tongues 62, the latter being bent down in assembly of the cover piece so as to lock the cover piece with its underlying base member. The position of the tongues 62 will preferably substantially coincide with the upper edge of the base member so that the tongues 62 may be forced down over the base edge to produce a relatively tight assembly with that member. Of course, suitable recesses may be provided in the base members, if desired, to receive the tongues 62. The flange 60 will preferably occur in the lap between adjacent courses of bases. It will be observed that the cover pieces should be applied immediately after mounting the base members with fasteners 44.

A further feature of the construction in Fig. 8 is the use of the flange 60 as a means of registering the next overlying course of base members and likewise to provide a moisture stop for the adjacent courses. It will be noted that the under face of the base members is provided with narrow slots 64 of sufficient size to freely fit over the struck-up flange 60. In this manner, the base members are held in position when the next overlying course of base members are secured as by fasteners 44 to the support. In connection with clapboard sidings, the upper end of the base members will be positioned slightly below the drip edge of the clapboards. However, the members may be applied against a flat support, utilizing filler members 30 to obtain a sound base for the securing means 44 of the base members. Obviously, the side edges of the adjacent cover pieces in the same course may be abutted and protected in the manner previously described with respect to Fig. 2, or the side faces may be overlapped, this being readily possible since a sheet metal construction permits use of a relatively thin sheet of material.

In Fig. 9, a construction is illustrated having some of the features of that in Fig. 8. The cover members in this instance are also preferably of metal and are provided with a lower retroverted portion of hook-like character similar to that in Fig. 2, formed by a section 26 and lip 28. In this case, however, the lip 28 does not fit over the base but fits over the flange 66 of a loop 68 formed by bending the upper marginal portion of the cover piece body with the extreme portion of the loop having a knob-like character. The end of the bent portion is adjacent the outer face of the cover piece and forms a short, flat flange 66 adjacent the loop portion. This flange is preferably spaced from the body portion of the cover piece a distance to allow for interlock with frictional engagement, of the upwardly turned lip 28 of an overlying cover piece. The base members may be uniform in section and require no lips of any kind. The lower end of the base at the rear face is provided with a groove or notch 70 co-extensive with the base and usually of right angle character. The upper portion of the base member at its front face is provided with a similar groove 72. In assembly, a base member is positioned and secured by a single line of nails 44. A cover piece is then positioned such that its hook-like lip 28 engages the flange 66 of the loop of the underlying cover member and such that its own knob portion snaps into the groove 72 at the upper margin of its base. Obviously, the base member will have its lower groove 70 positioned over the knob of the loop 68 of the underlying cover piece, so that it will be registered in position for nailing.

In laying the first course of members, the hook-like portion of the cover pieces will generally be either omitted or so shaped as to directly engage the butts of the base members. Obviously, the construction in Fig. 9 also dispenses with fasteners for the cover pieces. The knob portions act not only to form a weather-tight joint but also to register both the cover pieces and base members of the next overlying course. The cover pieces may be of simple construction, as can the base members. If desired, the cover pieces may be assembled as in the previous constructions with the joints protected from the weather by suitable backing members. However, in Figs. 10, 11 and 12, I have shown a cover piece for the construction of Fig. 9, in which the longitudinal ends of the cover members may overlap and form a weather-tight joint by means of a novel rib construction, each side marginal portion of the cover pieces being provided with outwardly pressed ribs 74 and 76, which are of interfitting character. The upper and lower edge portions are otherwise of similar construction to that illustrated in Fig. 9.

From the above description of my invention, it will be seen that I have produced novel surface covering constructions comprising base members and preformed cover pieces, which coverings are readily laid with a minimum of time and labor, and require few fasteners. These coverings are not to be confused with constructions involving the laying of wood boarding and flexible sheet covering material that is formed over the boarding on the job. In such constructions, handling of the sheet-cover material is cumbersome; also, the sheets must be alined and nailed independent of the boarding. The present constructions dispense with such independent nailing and with any nail heads in the lap of the members, thus assuring a proper assembly of adjacent lapping portions of the courses and good weather-tight joints. Moreover, in the present invention where metal cover members are utilized, it will be apparent that they may be secured without making any contact with nail heads and any electrolytic action between covering material and nails may be avoided. It will be understood that many changes in the exemplified constructions will suggest themselves to those skilled in the art without departing from the scope and spirit of the invention. Accordingly, I desire my invention to be construed including all equivalents and as broadly as the claims may allow. It will also be understood that the drawings, particularly as relates to size, filler piece shapes and slope of units, have been necessarily exaggerated.

The present application is a continuation-in-part of my copending application Serial No. 168,381.

I claim:

1. A surface covering comprising insulation members and cover pieces therefor, said insulation members being arranged in courses with the members in a course having an edge portion overlying the edge of a member in an adjacent course to form a lap and having an opposite edge portion underlying an edge of a member of another adjacent course to form another lap; means separating the adjacent portions in said laps between members of adjacent courses to provide a predetermined space to receive an edge portion of a cover piece; the cover pieces in the courses overlying the members in the same course, and the individual cover pieces having a preformed edge portion engaged with an edge portion of a member it overlies, which is the overlying edge portion of the lap between said member and a member in one of said adjacent courses of members and having another portion nesting in the space provided by the said lap between the said other edge portion of the member it overlies and the said overlying edge portion of a member of the other of said adjacent courses of members; and fastening means securing said cover pieces in place, said fastening means passing through the nesting portion of the cover piece and connecting the member it overlies with the member of said adjacent course of members providing the space for said nesting portion, and a cover piece of the latter members covering said fastening means.

2. A surface covering comprising insulation members and cover pieces therefor, said insulation members having projecting lips at their butt edges and being arranged in courses with the lips of members in one course overlying the upper edges of members of an adjacent course to form a lap, and with the upper edge portions of said overlying members underlying the lips of members of another adjacent course to form another lap; the adjacent faces forming said laps being fixedly spaced from each other a distance to allow for insertion of the edge portion of a cover piece; the cover pieces in the courses overlying the members in the same courses, and the individual cover pieces having a preformed edge portion engaged with the lip of a member it overlies and having another portion nesting in the space provided by the lap between the upper edge portion of the member it overlies and the said overlying lip of a member in the adjacent course; and fastening means securing said cover pieces in place, said fastening means passing through the nesting portion of the cover piece, and connecting the member it overlies with the lip of the member overlying said nesting portion and the cover piece of the latter member covering said fastening means.

3. A surface covering comprising insulation members and cover pieces therefor, said insulation members having front and rear lips along their lower edges separated by recesses, and the upper portion of said members being of less thickness than the width of the recess between said lips, said members being arranged in courses with the upper edge portions of members in one course inserted in the recesses of the lower edge portions of members of an adjacent course and with their own lower edge recesses engaged with the upper edge portions of members of another adjacent course of members; the said upper edge portions of the members abutting the rear lips of the members of the adjacent course and providing a predetermined space between said portions and the front lips of the said abutted members sufficient to receive the upper edge portion of a cover piece; said cover pieces in the courses overlying the members in the same course and the individual cover pieces having a preformed edge portion engaged with the front lip of a member it overlies and having another portion nesting in the space provided between the upper edge portion of the member it overlies and the front lip of the engaging member of the adjacent course; and fastening means and securing said cover pieces in place, said fastening means passing through the nesting portion of the cover piece and connecting the member it overlies with the front and rear lips of the adjacent member with which it is engaged and the cover piece of the latter member covering said fastening means.

4. A surface covering as claimed in claim 1, wherein the preformed edge portion of the cover pieces has an upwardly directed section to interlock with the insulation members and wherein the insulation members have a recess to receive said sections of the cover pieces.

5. A surface covering for weather boarding of the type having outwardly bevel faces with each face offset from the next by a shoulder, said surface covering comprising insulation members and cover pieces therefor, said members being arranged in overlapping courses with the lower edge portions of the members in one course overlying the upper edge portions of the members of an adjacent course, said members each having a thickness less than the offset between adjacent faces of the boarding and each course of members abutting a bevel face of the boarding and projecting beyond the shoulder formed by it with the next lower face whereby to provide a predetermined space in the lap between adjacent courses of members to receive an edge portion of a cover piece; said cover pieces overlying the members in the courses, and the individual cover pieces having a preformed edge portion engaged with the lower edge portion of the member it overlies and having another portion nesting in the lap between the member it overlies and the overlapping member of the adjacent course of members; and fastening means securing said cover pieces in place, said fastening means passing through the nesting portion of the cover piece and connecting the member it overlies with the overlapping member of the adjacent course of members and the cover piece of the said member of the adjacent course covering said fastening means.

6. A surface covering comprising insulation members and cover pieces therefor, said insulation members each having a tapered section and having a cut-out at the rear face of their butt edge portions forming a front edge lip, said cut-out having a depth normal to the rear face of the member greater than the thickness of the member at its upper edge portion; said members being arranged in courses with their rear faces abutting the underlying support and with the lips of members of one course overlying the upper edge portions of members in an adjacent course to form a lap, and with their upper edge portions underlying the lips of members of another adjacent course to form another lap; the difference between the depth of said cut-out of said members and the thickness of the upper edge portion of the members being such that the adjacent faces forming said laps are spaced from each other a predetermined distance to allow for insertion of the edge portion of a cover piece; said cover pieces overlying the members in the courses, and the individual cover pieces having a preformed edge portion engaged with the lip of a member it overlies and having another portion nesting in the space provided by the lap between the upper edge portion of the member it overlies and the overlying lip of a member in the adjacent course; and fastening means securing said cover pieces in place, said fastening means passing through the nesting portion of the cover piece and connecting the member it overlies with the lip of the member overlying said nesting portion, and the cover piece of the latter member covering said fastening means.

7. A surface covering member comprising a body of sheet-like material having front and rear faces and upper and lower edges, a rearwardly projecting flange at the lower edge of the body and a surface projection on the front face of the body spaced from the upper edge thereof, said projection forming a shoulder with the front face of the body between it and the upper edge of the body, said shoulder being substantially parallel to the lower edge of the body.

8. A surface covering comprising insulation members and cover pieces therefor, said insulation members having upper and lower edges and being arranged in courses with their lower edges overlapping the upper edges of members of an adjacent lower course of members and with their upper edges overlapped by the lower edges of the members of the adjacent higher course of members; said cover pieces having front and rear faces and upper and lower edges, the lower edges of the cover pieces having a rearwardly projecting flange and the front face having a surface projection spaced from the upper edge forming a shoulder with said face substantially paralleling the lower edge of the cover piece; said cover pieces overlying the members in a course with their upper edge portions inserted in the lap between the members they cover and that of the adjacent higher course of members and with their shoulders positioned subjacent the lower edges of said higher course of members and having their flange portions extending over the lower edges of the members they cover and substantially abutting the said shoulders of the cover pieces of the adjacent lower course of members.

9. A surface covering as claimed in claim 1, wherein the cover pieces are surfaced with a substance rigidifying the portion thereof in the lap between courses of members.

10. A surface covering as claimed in claim 1, wherein the members are secured to a wooden support and the cover piece fastening means are anchored in said support.

SIDNEY A. OCHS.